United States Patent [19]
Reynard et al.

[11] 3,856,712
[45] Dec. 24, 1974

[54] POLY(ALKOXYARYLOXYPHOSPHAZENE) ELASTOMERS

[75] Inventors: Kennard A. Reynard, Mentor; Selwyn H. Rose, Beachwood, both of Ohio

[73] Assignee: Horizons Incorporated, a Division of Horizons Research Incorporated, Cleveland, Ohio

[22] Filed: June 11, 1973

[21] Appl. No.: 368,844

[52] U.S. Cl. ............................. 260/2 P, 260/47 R
[51] Int. Cl. ..................... C08g 33/16, C08g 33/02
[58] Field of Search .................................. 260/2 P

[56] References Cited
UNITED STATES PATENTS

| | | | |
|---|---|---|---|
| 3,370,020 | 2/1968 | Allcock et al. | 260/2 P |
| 3,702,833 | 11/1972 | Rose et al. | 260/2 P |

*Primary Examiner*—Wilbert J. Briggs, Sr.
*Attorney, Agent, or Firm*—Lawrence I. Field

[57] ABSTRACT

Polyphosphazene copolymers which are elastomers and have one alkoxy and one aryloxy substituent are described. These inexpensive elastomers have improved thermal stability over poly(alkoxyphosphazene) elastomers and improved low temperature properties over poly(aryloxyphosphazene) elastomers.

10 Claims, No Drawings

POLY(ALKOXYARYLOXYPHOSPHAZENE) ELASTOMERS

This invention pertains to phosphazene elastomers useful from very low to moderate temperatures. More particularly, it pertains to soluble polymers which contain both alkoxy and aryloxy side chains on the phosphorus nitrogen backbone and to preparation of said copolymers.

Phosphazene homopolymers and copolymers which contain alkoxy- (or fluoroalkoxy-) side chains and/or aryloxy-side chains have been described in, for example, Inorg. Chem., 5-, 1709 (1966), Polymer, 11, 44 (1970), United States Patents 3,370,020, 3,700,629, and Polymer, 13, 253 (1972).

Known phosphazene homopolymers include $[(CH_3O)_2PN]_n$ and $[(C_2H_5O)_2PN]_n$ which are elastomers, and $[(C_6H_5O)_2PN]_n$, $[(4-ClC_6H_4O)_2PN]_n$, and $[(2,4-Cl_2C_6H_3O)_2PN]_n$, which are plastics. However, the poly(alkoxyphosphazenes) are not useful elastomers because they decompose at, or slightly above, room temperature (see Inorg. Chem., 5, 1709 (1966)).

Some aryloxyphosphazene copolymers, such as $[(C_6H_5O)_2PN-(4-sec-C_4H_9C_6H_4O)_2PN]_n$, are elastomers, but these copolymers do not retain elastomeric properties much below −40°F. In contrast, the copolymers of this invention are flexible at temperatures as low at −80°F.

Elastomeric phosphazene copolymers which contain aryloxy groups and fluoroalkoxy groups also have been prepared. For example, elastomers of the type $[(C_6H_5O)_2PN-(HCF_2C_3F_6CH_2O)_2PN]_n$ and $[(C_{12}H_7O)_2PN-(CF_3CH_2O)_2PN]_n$ have been described. However, the presence of fluorine in these materials makes them more expensive and reduces their solubility in solvents for the copolymers of this invention.

We have found that when phosphazene copolymers are prepared which contain selected quantities of both alkoxy and aryloxy side chains, the products are inexpensive elastomers with low glass transition temperatures and improved thermal stability. The polymers of this invention are soluble, high molecular materials which are characterized by repeating

units which contain alkoxy- and aryloxy-substituents on the phosphorus atoms in a nonregular fashion as shown below.

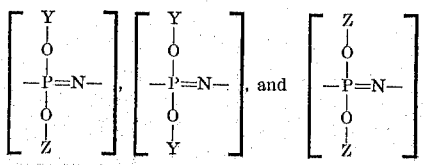

For the sake of simplicity, the formula for copolymers which contain these three groups is written as $[(YO)_2PN-(ZO)_2PN]_n$. A preferred ratio of Y:Z is between 4:1 and 2:3. The Y group represents alkyl from 1 to 15 carbon atoms and Z represents $-C_6H_4X$ or $-C_6H_3X_2$ where X is either H, alkyl from one to four carbon atoms, Cl or Br and the all of the X's need not be the same and may be located in the ortho, meta, or para position and $n$ is an integer between 10 and 50,000.

In order to predict which combination of Y and Z in these ratios will produce materials with the best elastic properties, certain rules should be applied. For purposes of prediction, in 1:1 copolymers the six carbon atoms in the phenoxy ring should be counted as three carbon atoms and the para alkyl carbon atoms or the para halogen atoms should be counted as one for each type of atom (ortho or meta substituents are not counted). The number of carbon atoms in Y should not be equal to the number of atoms in the Z substituent as counted above. Even when the number of carbon atoms are equal as counted above, leathery elastomers may be obtained but better elastomers may be prepared by increasing the amount of the Y substituent in the polymer. In the few cases were slightly leathery materials are obtained when the number of atoms in Y and Z differ by one, elastomeric properties are improved by increasing amounts of Y substituent in the copolymer.

These copolymers are elastomers useful from well below room temperature to over 230°F. They are considerably more thermally stable than known poly(alkoxyphosphazene) elastomers such as those described in Inorg. Chem., 5, 1709 (1966).

The elastomeric copolymers of this invention can be compounded and crosslinked by conventional techniques and are useful in a variety of applications such as rubber tires, hoses, gaskets and potting compounds. Some of the copolymers have excellent fire-resistant properties and outstanding mechanical properties.

The process for the preparation of the copolymers of this invention herein disclosed is now described. Poly(dichlorophosphazene) is dissolved in a suitable solvent such as benzene, toluene, xylene, chlorobenzene, dichlorobenzene, tetrahydrofuran or mixtures thereof. To this well stirred polymer solution is gradually added a solution or suspension of the aryloxide salt. Sodium salts are normally employed but lithium or potassium salts are also suitable. The mole percent of salt can vary over the range specified earlier based on equivalents of chlorine present in the poly(dichlorophosphazene). The reaction temperature will generally be in the range of from below room temperature to 200°C, but is preferably in the range 20°to 130°C. When this reaction is essentially complete, as evidenced by a drop in pH to about 7, the alkoxide salt is added. The reaction temperature for the second reaction step can vary from below room temperature to about 200°C, but is preferably between 20°–140°C. The upper temperature limits are determined by the reactivity of the salts, steric requirements, and polymer solubility. Reaction times of 3 to 150 hours will lead to complete reaction of the phosphorus-chlorine sites on the polymer. The phosphazene copolymers so produced may be isolated by conventional methods.

This method for the preparation of the copolymers of this invention afforded materials which were essentially free of P-Cl sites ( ≤ 0.1% Cl). However, the addition of poly(dichlorophosphazene) to a solution of the mixture of alkali metal salts of the phenol or substituted phenol and the aliphatic alcohol both present in excess also can be used to prepare copolymers. However, in the latter process, generally a larger amount of the aliphatic substituent is introduced onto the backbone than stoichiometry would predict. This effect may be due to the reduced basicity of the alkali metal aryloxides or to their steric requirements as compared to the alkoxides. Similar reaction conditions and reaction times are applicable for this process.

Preparation of copolymers of this invention is illustrated by the following examples which are not intended to limit the scope of the invention.

EXAMPLE 1

Preparation of $[(CH_3O)_2PN-(C_6H_5O)_2PN]_n$ Copolymer

A solution of sodium phenoxide prepared from phenol (118.5 g, 1.26 moles), 88 ml of bis(2-methoxyethyl)ether and sodium (27.6 g, 1.20 moles) was added over 15 minutes to a stirred solution of $[Cl_2PN]_n$ polymer (139.2 g, 2.40 equivs.) in 1.1 liters of benzene. A solution of sodium methoxide prepared from methanol (195.5 g, 6.10 moles), 500 ml of bis(2-methoxyethyl) ether and sodium (29.0 g, 1.26 moles) was added over 1 hour. Benzene was distilled until the temperature was 125°C and the reaction was heated for an additional 24 hours. The polymer was precipitated with 4 liters of methanol, and washed with methanol, dried, dissolved in benzene, washed with water, and dried. The product (33.2 g, 16% yield) was a strong, snappy elastomer and had an intrinsic viscosity in benzene of 0.5 dl/g at 30°C. Anal. Calcd. for $[(CH_3O)_2PN-(C_6H_5O)_2PN]_n$: C, 49.7; H, 4.7; N, 8.3; Cl, 0.0. Found: C, 46.1; H, 4.8; N, 8.7; Cl, 0.2. Proton NMR showed the $CH_3O/C_6H_5O$ ratio to be approximately 1:1.

EXAMPLE 2

$[(C_2H_5O)_2PN-(C_6H_5O)_2PN]_n$

The $[Cl_2PN]_n$ polymer (40.0 g, 0.69 equiv.) was dissolved in 700 ml of benzene and added over an hour to a solution of alkoxides which was prepared from ethanol (19.0 g, 0.422 mole), phenol (33.7 g, 0.358 mole) and sodium (16.2 g, 0.704 mole) in 100 ml of tetrahydrofuran. The mixture was stirred at 115°C (sealed reactor) for 60 hours and the volume was reduced under vacuum to about 200 ml. The semi-solid mass was washed with 500 ml of methanol and the residue was suspended in a large volume of acetone with stirring at room temperature. Water was added to remove sodium chloride and precipitate the copolymer. The product was a colorless, rubbery material which had an intrinsic viscosity in benzene of 2.7 dl/g at 30°C and a Tg of −70°C. Anal. Calcd. for $[(C_2H_5O)_2PN-(C_6H_5O)_2PN]_n$: C, 52.5; H, 5.5; N, 7.7; Cl, 0.0. Found: C, 52.0; H, 5.2; N, 7.6; Cl, ≤ 0.1. Proton NMR confirmed approximately a 1:1 ratio of substituents.

EXAMPLE 3

$[(n-C_5H_{11}O)_2PN-(C_6H_5O)_2PN]_n$

A solution of sodium phenoxide prepared from phenol (43.7 g, 0.465 mole) and sodium (10.5 g, 0.455 mole) in 400 ml of tetrahydrofuran was added at room temperature in an hour to a stirred solution of $]Cl_2PN]_n$ polymer (51.2 g, 0.88 equiv.) in 1 liter of benzene. Sodium n-amyloxide which was prepared from n-amyl alcohol (116.7 g, 1.33 moles) and sodium (10.5 g, 0.455 mole) was added over 1 hour to the mixture. The reaction mixture was stirred at room temperature for 3 hours and refluxed overnight. The polymer was precipitated by addition to 4 liters of methanol at −30° and dissolved in 1.5 liters of methylene chloride, exhaustively washed with distilled water and reprecipitated into 5 liters of methanol. The product was a light tan elastomer with an intrinsic viscosity in benzene of 2.1 dl/g at 30°C and had a Tg of −72°C. Anal. Calcd. for $[(C_5H_{11}O)_2PN-(C_6H_5O)_2PN]_n$: C, 58.6; H, 7.1; N, 6.2; Cl, 0.0. Found: C, 58.5; H, 7.2; N, 6.2; Cl, 0.1. Proton NMR indicated the substituents were present approximately in a 1:1 ratio.

EXAMPLE 4

Preparation of $[(n-C_5H_{11}O)_2PN-(4-ClC_6H_4O)_2PN]_4$

A solution of sodium 4-chlorophenoxide prepared from 4-chlorophenol (62.5 g, 0.486 mole) and sodium (10.5 g, 0.455 mole) in 400 ml of tetrahydrofuran was added in 1 hour to a solution of $[Cl_2PN]_n$ polymer (51.2 g, 0.88 equiv.) in 1 liter of benzene. Sodium n-amyloxide, which was prepared from n-amyl alcohol (116.7 g, 1.33 moles) and sodium (10.5 g, 0.455 mole) at 80°C, was added over ¾ hour to the polymer mixture. The mixture was diluted with 500 ml of chlorobenzene, refluxed 15 hours, and cooled. The copolymer was precipitated by addition to 4 liters of methanol at −30°C. The copolymer was dissolved in 1.5 liters of chloroform-Freon TA (1v/2v) and washed with methanolwater (1v/1v) and was precipitated in 6 liters of methanol to give 59.5 g (52.3% yield) white, slightly tacky elastomer which had an intrinsic viscosity in benzene of 0.5 dl/g at 30°C and a Tg of −60°C. Anal. Calcd. for a 1:1 copolymer of $[(C_5H_{11}O)_2PN-(4-ClC_6H_4O)_2PN]_n$: C, 51.0; H, 5.8; Cl, 13.7. Found: C, 49.6; H, 5.4; Cl, 13.2. Proton NMR indicated the substituent ratio to be approximately 1:1.

EXAMPLE 5

Preparation of $[(n-C_5H_{11}O)_2PN-(2,4-Cl_2C_6H_3O)_2PN]_n$ Copolymer

A solution of sodium 2,4-dichlorophenoxide prepared from 2,4-dichlorophenol (71.4 g, 0.45 mole), 250 ml of bis(2-methoxyethyl) ether and sodium (9.6 g, 0.42 mole) was added over 30 minutes to a stirred solution of $[Cl_2PN]_n$ polymer (48.4 g, 0.84 equiv.) in 840 ml benzene. A solution of sodium n-amyloxide prepared from n-amyl alcohol (73.6 g, 0.84 mole), 125 ml of bis(2-methoxyethyl) ether, and sodium (10.1 g, 0.45 mole) was added over 1 hour. The mixture was stirred for 40 hours at ambient temperature and than heated 15 hours at 80°C. The polymer was precipitated with methanol, washed with methanol, dissolved in benzene, washed with water, and dried. The rubbery product (65.0 g, 56% yield) had an intrinsic viscosity in benzene of 1.0 dl/g at 30°C. This material was self-extinguishing when withdrawn from a gas/oxygen flame. Anal. Calcd. for $[(C_5H_{11}O)_2PN-(Cl_2C_6H_3O)_2PN]_n$: C, 42.9; H, 4.3; N, 5.1; Cl, 25.4. Found: C, 42.7; H, 4.4; N, 5.1; Cl, 25.6. Proton NMR showed the $n-C_5H_{11}O/2,4-Cl_2C_6H_3O$ ratio to be about 1:1.

EXAMPLES 6–17

By following the procedure of Example 5, but using the indicated sodium alkoxide and sodium aryloxide, the copolymers of Examples 6–17 were prepared.

Examples 6-17

| Ex. | NaOR R= | NaOR' R'= | Mole Ratio R/R' | [η] | Analysis (%)[c] | | | |
|---|---|---|---|---|---|---|---|---|
| | | | | | C | H | N | Cl |
| 6 | $CH_3$ | $4\text{-}ClC_6H_4$ | 1:1 | 1.5[a] | 40.5 (41.3) | 3.5 (3.4) | 6.9 (6.9) | 17.0 (17.4) |
| 7 | $n\text{-}C_3H_7$ | $4\text{-}ClC_6H_4$ | 1:1 | 1.3[a] | 46.5 (46.7) | 4.9 (4.8) | 6.1 (6.1) | 15.4 (15.3) |
| 8 | $n\text{-}C_5H_{11}$ | $4\text{-}BrC_6H_4$ | 1:1 | 1.8[a] | 43.2 (43.4) | 4.8 (4.9) | 4.5 (4.6) | 26.9[d] (26.8) |
| 9 | $n\text{-}C_5H_{11}$ | $3\text{-}BrC_6H_4$ | 1:1 | 1.5[a] | 44.4 (43.4) | 4.9 (4.9) | 4.9 (4.6) | 26.4[d] (26.3) |
| 10 | $n\text{-}C_{12}H_{25}$ | $4\text{-}C_4H_9C_6H_4$ | 1:1 | 1.1[b] | 70.4 (69.7) | 10.4 (10.0) | 3.8 (3.7) | 0.1 (0.0) |
| 11 | $n\text{-}C_5H_{11}$ | $4\text{-}ClC_6H_4$ | 4:1 | 2.0[a] | 53.3 (53.2) | 8.2 (8.1) | 6.0 6.1 (6.0) | (6.0) <0.1 |
| 12 | $n\text{-}C_5H_{11}$ | $C_6H_5$ | 2:3 | 2.1[b] | 59.9 (59.3) | 6.6 (6.6) | 6.1 (6.2) | (0.0) <0.1 |
| 13 | $n\text{-}C_3H_7$ | $4\text{-}ClC_6H_4$ | 3:1 | 2.3[b] | 45.6 (45.7) | 6.9 (6.6) | 7.0 (7.1) | 9.1 (9.1) |
| 14 | $CH_3$ | $2\text{-}CH_3C_6H_4$ | 1:1 | 1.6[b] | 51.2 (52.5) | 5.3 (5.5) | 7.8 (7.7) | <0.1 (0.0) |
| 15 | $C_2H_5$ | $2\text{-}CH_3C_6H_4$ | 2:1 | 1.3[b] | 50.0 (50.2) | 5.6 (5.7) | 8.0 (8.0) | 0.1 (0.0) |
| 16 | $n\text{-}C_6H_{13}$ | $3,5\text{-}di\text{-}CH_3C_6H_3$ | 1:1 | 1.2[b] | 62.0 (62.9) | 8.0 (8.2) | 5.2 (5.2) | <0.1 (0.0) |
| 17 | $n\text{-}C_6H_{13}$ | $4\text{-}Cl\text{-}3\text{-}CH_3C_6H_3$ | 1:1 | 1.5[b] | 54.0 (54.3) | 6.2 (6.6) | 4.8 (4.9) | 12.4 (12.3) |

[a] Intrinsic viscosity in tetrahydrofuran at 30°C
[b] Intrinsic viscosity in benzene at 30°C
[c] Calculated values appear in parentheses
[d] % Br

EXAMPLE 18

[(C₂H₅O)₂PN]ₙ (Comparative)

A solution of $[Cl_2PN]_n$ (11.6 g, 0.20 equiv.) in 125 ml of benzene was added over an hour to a stirred solution of sodium ethoxide, prepared from ethanol (125 ml) and sodium (5.75 g, 0.25 mole). The mixture was stirred at room temperature for 4 days and neutralized with dilute hydrochloric acid. The benzene layer was dried ($MgSO_4$) and polymer precipitated by addition to petroleum ether. The polymer was a colorless, elastomeric material (37% yield) which was soluble in ethanol, benzene, ethyl ether, but insoluble in n-hexane and water. Anal. Calcd. for $[(C_2H_5O)_2PN]_n$: C, 35.6; H, 7.4; N, 10.4; Cl, 0.0. Found: C, 35.2; H, 7.4; N, 10.4; Cl, <0.1. This material underwent spontaneous crosslinking on standing at room temperature.

EXAMPLE 19

[(C₆H₅O)₂PN]ₙ (Comparative)

The $[Cl_2PN]_n$ polymer (11.7 g, 0.20 equiv.) was dissolved in 100 ml of toluene and added over 40 minutes to a solution (115°C) of sodium phenoxide which was prepared from phenol (22.7 g, 0.242 mole) and sodium (5.33 g, 0.232 mole) in 150 ml of bis(2-ethoxyethyl)ether/dioxane (3v/1v). The mixture was maintained at 115°C for 40 hours. Polymer was precipitated by addition of methanol, and purified by exhaustively washing with aqueous methanol (1v/1v). The product was dissolved in warm tetrahydrofuran (200 ml) and distilled water (100 ml) was added to precipitate the white, crystalline solid (7.8 g, 25% yield) which did not melt up to 300°C. The intrinsic viscosity in tetrahydrofuran was 2.6 dl/g at 40°C. Anal. Calcd. for $[(C_6H_5O)_2PN]_n$: C, 62.3; H, 4.3; N, 6.1; Cl, 0.0. Found: C, 62.0; H, 4.3; N, 6.0; Cl, <0.1.

EXAMPLE 20

[(4-n-C₅H₁₁C₆H₄O)₂PN]ₙ (Comparative)

The $[Cl_2PN]_n$ polymer (11.6 g, 0.20 equiv.) was dissolved in 100 ml of benzene/xylene (1v/1v) and was added over 30 minutes to solution (115°C) of sodium n-amylphenoxide which was prepared from (4-n-amylphenol) (39.4 g, 0.24 mole) and sodium (5.04 g, 0.22 mole) in 150 ml of bis(2-ethoxyethyl)ether/dioxane (3v/1v). Benzene was distilled and the temperature was maintained for 35 hours. Polymer was precipitated by addition of methanol and was dissolved in 200 ml of methylene chloride, was washed exhaustively with water and was precipitated with methanol. The polymer was a soft, tan, fibrous plastic with an intrinsic viscosity in benzene of 1.9 dl/g at 30°C. Anal. Calcd. for $[(C_5H_{11}C_6H_4O)_2PN]_n$: C, 71.2; H, 8.1; N, 3.8; Cl, 0.0. Found: C, 70.9; H, 8.1; N, 3.7; Cl, < 0.1.

We claim:

1. Polyphosphazene copolymers consisting of reacting units which are distributed in a nonregular fashion and are represented by the formulas:

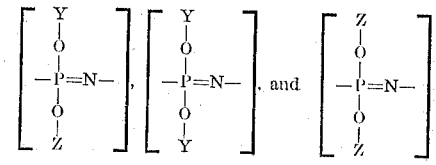

wherein each Y represents an alkyl group which contains from one to 15 carbon atoms and each Z represents an aryl group representing a formula selected from the group consisting of $-C_6H_4X$ and $-C_6H_3X_2$ in which each X is selected from the group consisting of H, alkyl with 1 to 4 carbon atoms, Cl and Br and all of the X's need not be the same, and the ratio of Y:Z is between 4:1 and 2:3 and the number of such units in the copolymer is between 10 and 50,000.

2. The copolymers of claim 1 where Z is 4halo-$C_6H_4-$ and halo is Cl or Br.

3. The copolymers of claim 1 where Z is 4-Cl-3-$CH_3C_6H_3-$.

4. The copolymers of claim 1 where Y is $CH_3-$ and Z is $C_6H_5-$.

5. The copolymers of claim 1 where Y is $C_2H_5-$ and Z is $C_6H_5-$.

6. The copolymers of claim 1 where Y is n-$C_5H_{11}$ and Z is $QC_6H_4$- and Q is H, Cl, or $CH_3$.

7. The copolymers of claim 1 where Y is $CH_3$— and Z is $Cl_2C_6H_3$—.

8. The process for the preparation of the copolymers of claim 1 in which poly(dichlorophosphazene) is reacted with alkali metal salts of an alcohol, and phenol or a substituted phenol, at temperatures between below room temperature and 200 C.

9. A process for the preparation of the soluble, high molecular weight polymers of claim 1 which comprises reaction of $[Cl_2PN]_n$ polymer with an alkali metal salt of YOH at 20°–130°C followed by reaction of this product with an alkali metal salt of ZOH at 20°–140°C when Y and Z and $n$ are as defined in claim 1.

10. Shaped articles and films prepared from the copolymers of claim 1.

* * * * *